United States Patent

[11] 3,587,339

[72] Inventor Jack J. Gilbert
 Suffern, N.Y.
[21] Appl. No. 843,133
[22] Filed July 18, 1969
[45] Patented June 28, 1971
[73] Assignee Spyro Dynamics Corporation,
 Northvale, N.J.
 Continuation-in-part of application Ser. No.
 749,849, Aug. 2, 1968, now Patent No.
 3,537,334, dated Nov. 3, 1970, and a
 continuation-in-part of 749,850, Aug. 2,
 1968, now abandoned.

[54] RIGHT-ANGLE DRIVE
 5 Claims, 13 Drawing Figs.
[52] U.S. Cl. ........................................... 74/416,
 74/464, 74/690
[51] Int. Cl. .......................................... F16h 1/12,
 F16h 55/10, F16h 37/06
[50] Field of Search .......................................... 74/690,
 681, 464, 425, 465, 691, 675, 416

[56] References Cited
UNITED STATES PATENTS

| 134,642 | 1/1873 | Chormann | 74/464X |
| 635,875 | 10/1899 | Smith | 74/464 |
| 879,679 | 2/1908 | Schmick | 74/464 |
| 2,312,105 | 2/1943 | Liebrecht | 74/691 |
| 2,334,074 | 11/1943 | Coy | 74/675UX |
| 2,408,666 | 10/1946 | Mallard | 74/464 |
| 2,466,762 | 4/1949 | Campbell | 74/691X |
| 2,481,039 | 9/1949 | Ross | 74/690X |
| 2,755,683 | 7/1956 | Ryan | 74/690X |
| 3,263,523 | 8/1966 | Hash | 74/690X |

Primary Examiner—A. T. McKeon
Attorney—Ward, Mc Elhannon, Brooks and Fitzpatrick ABSTRACT: A right-angle drive comprising a ball-toothed gear having a plurality of universally rotatable spaced balls at its periphery and driven by a rotatable face gear having a spiral groove into which one or more of the balls fit. The drive is applied to the control of the planetary gears in a planetary gear train to provide a continuously variable speed drive which is reversible.

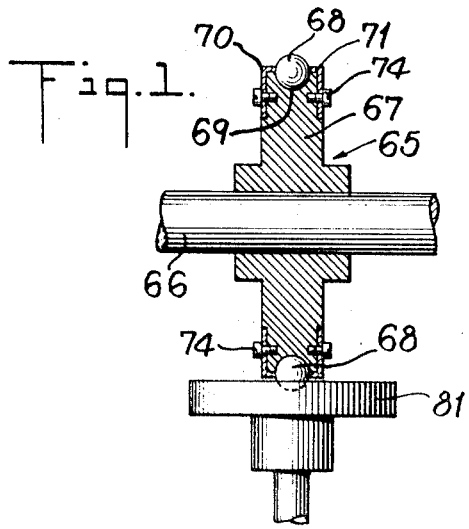
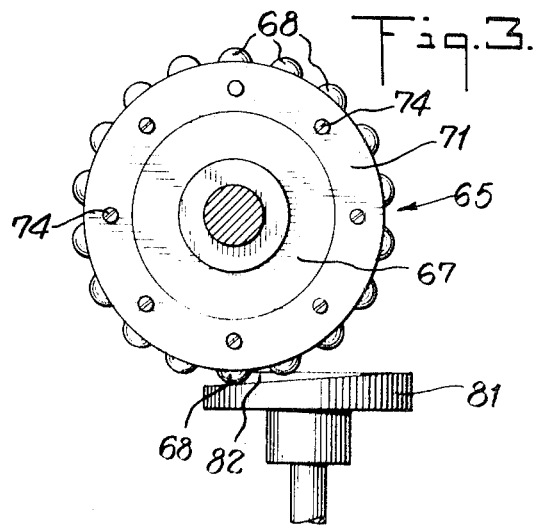
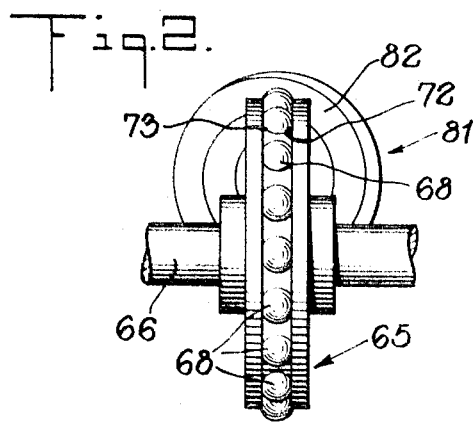
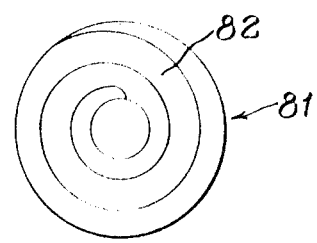
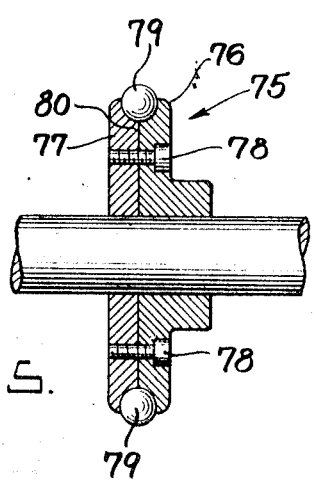

INVENTOR
JACK J. GILBERT
BY Ward, McElhannon,
Brooks & Fitzpatrick
ATTORNEYS

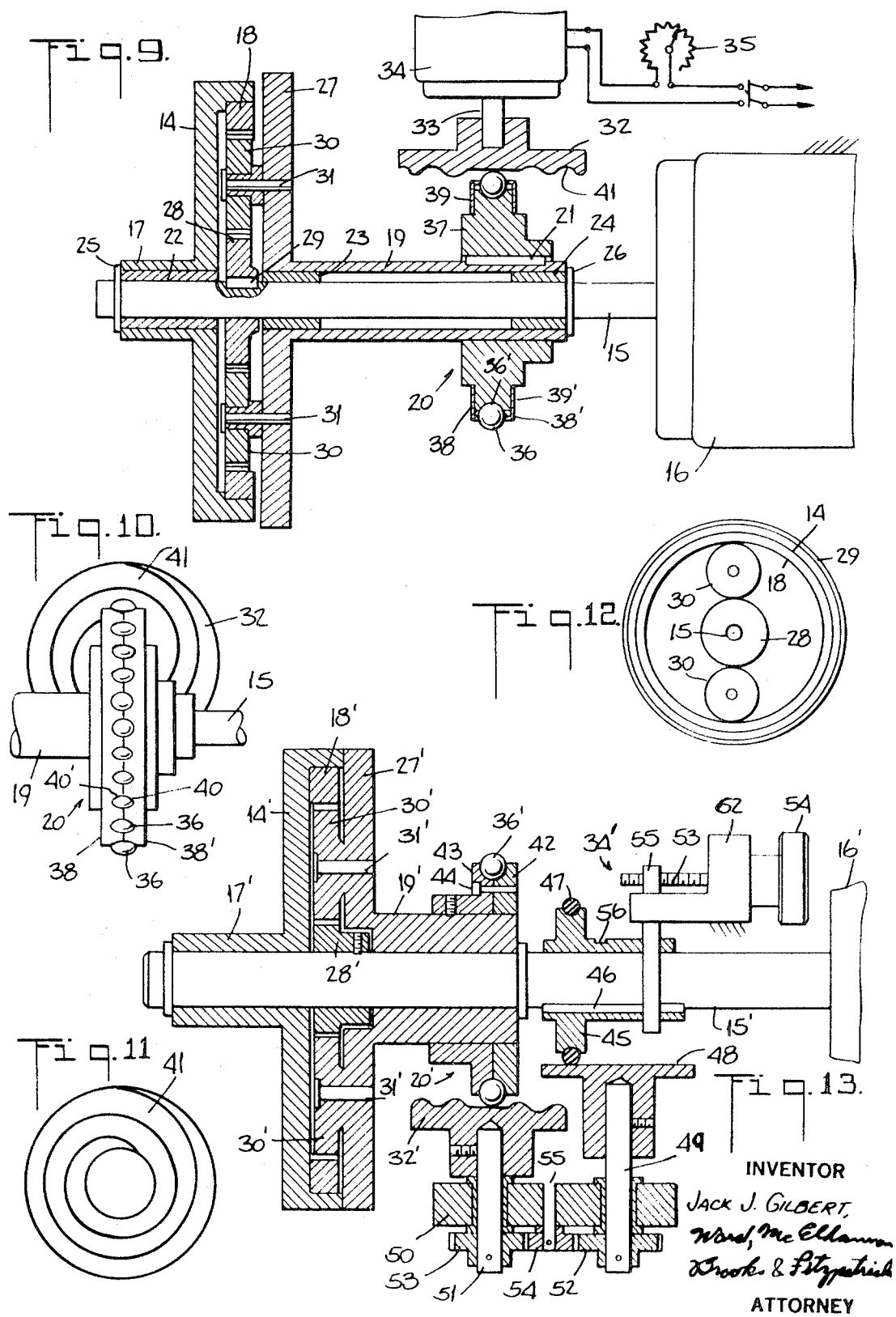

RIGHT-ANGLE DRIVE

1 This application is a continuation-in-part of my copending applications Ser. No. 749,849 now U.S. Pat. No. 537,334 granted on Nov. 3, 1970 and Ser. No. 749,850, now abandoned entitled Infinitely Variable Positive Drive Speed Changer Which Can Also Act as a Reverser and Spur Gear Constructions to be Driven by a Spiral Face Cam or a Worm wheel, respectively, and both filed on Aug. 2, 1968.

This invention relates to a right-angle drive and a continuously variable speed drive which may include such right-angle drive.

Right-angle gear drives are well known in the art and when it is desired to obtain a high output torque or a large speed reduction in a small space, worm gearing normally is used. However, with such gearing under such conditions and as made commercially, the efficiency, i.e., the useful output to input, may be as low as 20 percent, and if the worm is self-locking, cannot exceed about 50 percent. With worm gearing, the worm wheel tends to override, or backdrive, the worm gear making speed control therewith difficult.

The present invention relates to a right-angle drive in which the efficiency may be as high as 99 percent, or higher, with high output to input torque and speed ratios and in which the output gear shows insignificant, if any, tendency to override the input gear. For example, right-angle drives of the invention have the following representative characteristics, the input shaft being driven by an electric motor at a speed of 1,725 r.p.m.:

| Input horsepower | Speed ratio | Output, r.p.m. | Stall torque inch-lbs. |
|---|---|---|---|
| ¼ | 22:1 | 78 | 495 |
| ¼ | 50:1 | 35 | 1,125 |
| ½ | 22:1 | 78 | 990 |
| ½ | 50:1 | 35 | 2,250 |
| 2 | 22:1 | 78 | 3,960 |
| 2 | 50:1 | 35 | 9,400 |

Because of the characteristics of the drive of the invention, smaller motors can be used to drive or control a given load, and in addition, the drive is particularly useful for the control of a variable speed drive not only because a small motor can control a variable speed drive operated by a much larger motor but also because the substantial elimination of backdriving permits precise and uniform speed control with varying speeds and loads.

In the right-angle drive of the invention, a ball-toothed gear is driven by a face gear having a spiral groove therein into which one or more ball teeth fit. The ball-toothed gear has a plurality of spaced, spherical balls mounted at the periphery thereof so as to be free to rotate in any direction. Each ball acts as a gear tooth which engages the spiral groove, which is arcuate in cross section, and as the face gear is rotated, the contacting ball or balls follow the groove causing the ball-toothed gear to rotate. The speed ratio between the speeds of rotation of the face gear and the ball-toothed gear is controlled by the pitch of the spiral groove and the numbers of balls on the ball-toothed gear. Because each ball is free to rotate in any direction, or universally and there is a very small area of contact, almost point contact, between each ball and the face gear, the friction is exceedingly low. Because of the low amount of friction and the long life and rotatability of the balls, the drive has a long life and a high thermal horsepower rating. Because of the sidewalls of the groove, backdrive is substantially eliminated.

In one application of the invention, the drive is used in a novel manner to control the planetary gears in a continuously variable, stepless drive, the planetary gear train being known per se but the manner of controlling it to provide a variable output speed being novel. Such control in an economical manner is possible by virtue of the high efficiency and other characteristics, e.g. lack of backdrive, of the right-angle drive of the invention.

One object of the invention is to provide a right-angle drive which may be used to replace a worm and worm wheel drive and which has a higher efficiency and longer life than such worm gearing.

Another object of the invention is to provide a right-angle drive which has a higher horsepower and thermal rating than worm gearing of a corresponding overall size.

A further object of the invention is to provide a continuously variable and reversible planetary gear drive which may be controlled by the right-angle drive of the invention.

Other objects and advantages of the invention will be apparent from the following detailed description of presently preferred embodiments thereof, which description should be considered in conjunction with the accompanying drawings in which:

FIG. 1 is a side elevation view, partly in cross section, of one embodiment of the right-angle drive of the invention;

FIGS. 2 and 3 are, respectively, plan and end elevation views of the embodiment shown in FIG. 1;

FIG. 4 is a partly schematic, plan view of the face of the spirally grooved face gear used in the embodiments shown in FIGS. 1–3;

FIG. 5 is a side elevation view, partly in cross section, of a modified form of the ball-toothed gear forming part of the right-angle drive of the invention;

FIG. 9 is a partly schematic, side elevation view, partly in cross section, of a variable speed drive using the right-angle drive of the invention for control thereof;

FIG. 10 is a bottom view of the right-angle drive portion of the embodiment shown in FIG. 9;

FIG. 11 is an end view of the face gear employed in the embodiments shown in FIGS. 9 and 10;

FIG. 12 is a fragmentary end view of the planetary gear system shown in FIG. 9; and FIG. 13 is a side elevation view of a modified embodiment of the variable speed drive.

Figure 6:
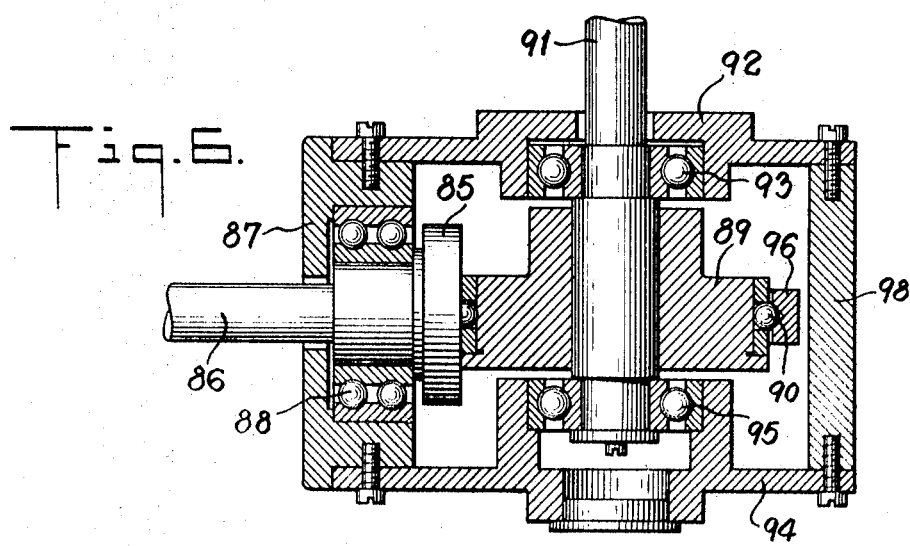
FIG. 6 is a plan view, partly in cross section, of a preferred embodiment of the right angle drive of the invention.

In FIG. 1—4, the numeral 65 designates generally a ball-toothed gear, hereinafter sometimes called a ball gear, which is carried on a rotatable shaft 66 and to which it is secured in any conventional manner so that the shaft 66 will rotate therewith. Such ball gear comprises a wheel body 67, along whose periphery are a multiplicity of identical, equispaced teeth, each of which is a spherical steel ball 68 and may, for example, be a hardened steel ball of the type used in ball bearings. Each ball 68 is free for rotation in all directions about its geometric center, all such centers being in a plane perpendicular to the axis of rotation of such gear and in a circle concentric with such axis. Each ball 68 sits in a socket 69 in the wheel's periphery. Each such socket is a spherical segment having an altitude preferably slightly less than but a radius substantially equal to the radius of the ball 68. The numerals 70,71 designate ball-retaining ferrules, the rim of each of which have equispaced semicircular notches, one for each ball. A notch of each ferrule straddles part of a ball and companion notches 72,73 provide a pair of spaced segments of a diameter slightly less than that of the ball. The ferrules are secured to the wheel body 67 by a series of screws 74. Each ball is therefore free to turn in all directions or universally.

Another ball gear construction is denoted generally by the numeral 75 in FIG. 5 and comprises two full wheel parts 76 and 77 set face to face and held together by screws 78. The geometric centers of all the ball teeth 79 are in the parting plane 80 of said wheel parts. Each of these parts have matching notches, so they form a socket a bit more than a semisphere to retain the balls and yet permit them to rotate in all directions.

Figure 7:
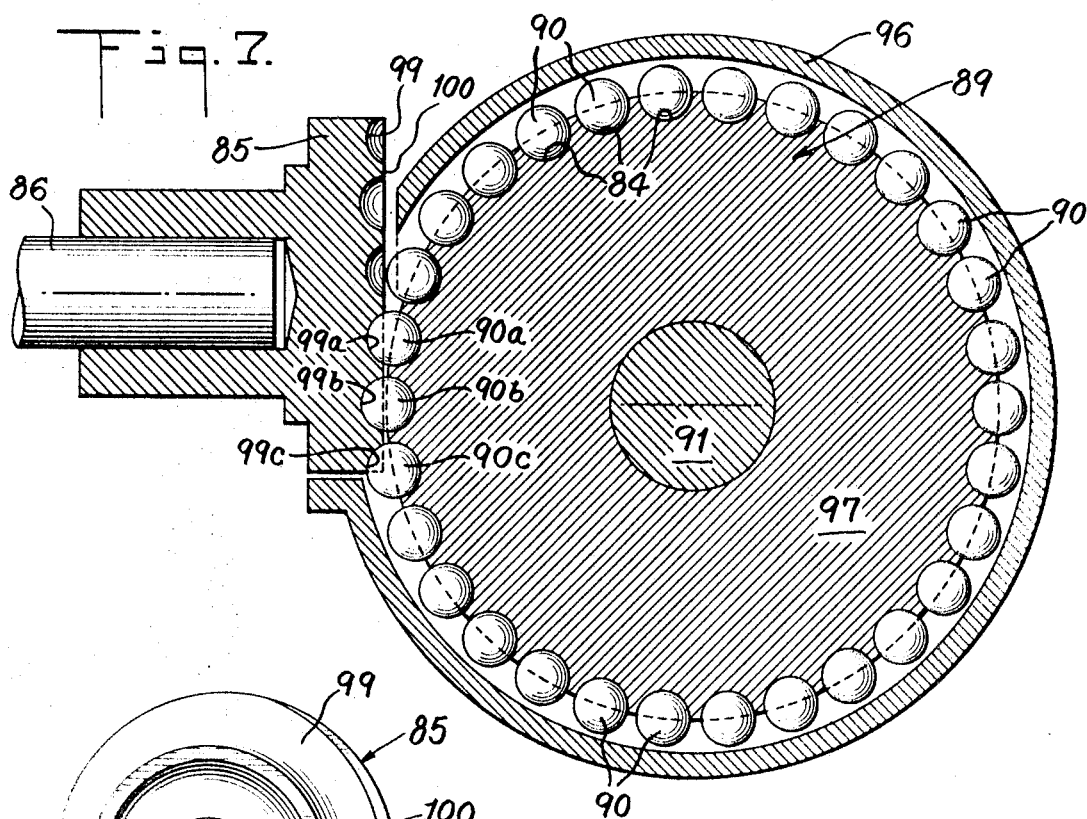
FIG. 7 is a fragmentary, enlarged, end elevation view of the ball-toothed gear and the face gear forming part of the embodiment shown in FIG. 6.

In FIGS. 1—4, the ball gear 65 is driven by a rotatable, driven, face gear 81 by engagement of the balls 68 thereof in a spiral channel or groove 82 in the face of face gear 81. The spiral channel or groove 82 is illustrated schematically in FIG. 4 and preferably, is a regular or Archimedes spiral so that the movement of the ball gear 65 will be uniform. In cross section, and as shown in FIG. 7 hereinafter, the groove 82 is arcuate and has a radius slightly greater than the radius of the balls 68. The distance of the axis of the shaft 66 from the bottom of the groove 82 is selected so that a ball 68 in the groove 82 presses against the bottom of the groove 82 when a line extending from said axis and containing the center of such ball intersects the face of the gear 81 perpendicularly. There is substantially only point contact between the surface of a ball 68 and the wall of the groove 82 at all times.

As the face gear 81 is rotated, each ball 68, in turn, enters into the groove 82 and is displaced through an angle dependent upon the pitch of the spiral so that for each revolution of the face gear the ball gear 65 rotates by an amount equal to the distance between the centers of adjacent balls 68. The wall of the groove 82 may also be made of hardened steel so as to minimize wear. Of course, both the balls 68 and the gear 81 may be lubricated to minimize friction and so as to cause the balls 68 to ride in their sockets on a film of lubricant.

It will be noted that as the gear 81 rotates, it subjects the balls 68 to forces directed circumferentially and radially of the gear 81. However, since the balls 68 are free to rotate in any direction, sliding friction is kept to a minimum. In addition, the balls 68, being spherical, can withstand large forces, and since they rotate about their centers as the drive operates, the wear is distributed over their entire faces rather than confined to the same faces as in worm gearing.

Because of the pitch of the spiral and because the wall of the groove 82 closely surrounds the portion of the ball 68 therein, there is no significant backlash in the drive, and if one attempts to rotate the ball gear 65, no corresponding rotation of the face gear 81 results. Accordingly, the speed of rotation of the ball gear 65 is closely controlled by the gear 81 and variations in the speed or load in the ball gear 65 do not cause overriding or backdrive.

A preferred embodiment of the invention is shown in FIGS. 1—8 which illustrate a right-angle drive embodying the invention. It will be noted from an examination of the embodiments shown in FIGS. 1—4 that the bottoms of the grooves 82 lie in a flat plane and that only a single ball 68 is in active engagement with a groove 82 at any given time. For the purpose of increasing the load which can be transmitted through face gear 82 and the ball-toothed gear 65 and to assure proper engagement of the balls 68 with the grooves 82, the spiral grooved face gear may be made with the bottom of the groove thereof lying along a curved or arcuate path having a radius substantially equal to the radius of the ball gear from the outermost surface of the balls 68 to the center of the shaft carrying the ball gear 65 so that a plurality of the balls 68 will be in engagement with the groove on the face gear at all times.

Figure 8:
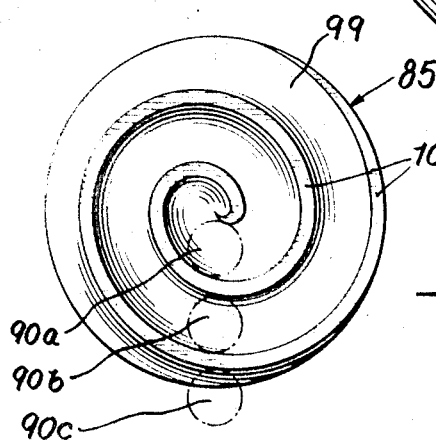
FIG. 8 is an end view of the face gear used in the embodiments shown in FIGS. 6 and 7.

In the embodiment shown in FIGS. 6—8, the face gear 85 is mounted on an input or driven shaft 86 so as to rotate therewith, and the shaft is supported from the housing 87 by means of a ball bearing 88. The ball gear 89, having a plurality of steel balls 90 at the periphery thereof, is mounted on a shaft 91 and is keyed or otherwise secured thereto so as to cause the shaft 91 to rotate with the gear 89. The shaft 91 is supported from the end cover 92 by a ball bearing 93 and from the end cover 94 by a ball bearing 95. A race 96 extends around the periphery of the gear 89 and retains the balls 90 in their sockets 84 in the periphery of the body 97 of the ball gear. The race 96 terminates short of the face gear 85 and is prevented from rotation with the gear 89 by virtue of its engagement with the periphery of the face gear 85.

As illustrated in FIG. 8, the face gear 85 has a single spiral groove 99 with a wall 100. As shown in FIG. 7, the bottom of the groove 99, as at 99a, 99b and 99c, lies at a distance from the center of the output shaft 91 which is substantially equal to the radial distance of the outermost portions of the balls 90 from the center of the shaft 91. With such a configuration of the groove 99, a plurality of balls 90 will be in engagement with the face gear 85 at all times, and in the embodiment shown in FIG. 7, the balls 90a, 90b, and 90c are in engagement with the groove 99. FIG. 8 illustrates the relationship of the balls 90a—c to the groove 99. It will be noted from FIG. 7 that the center of the output shaft 91 lies below the center of the input shaft 86.

In the embodiment illustrated in FIGS. 6—8, the shaft 86 which may be the output shaft of an electric motor, or may be otherwise driven, rotates the spiral-grooved face gear 85 which in turn engages in balls 90 and causes the ball-toothed gear 89 to rotate. For each revolution of the face gear 89, a ball 90 moves through a distance substantially equal to the radius of the face gear 85 so that there is a speed reduction, the ball-toothed gear 89 making one revolution for a plurality of revolutions of the face gear 85.

Planetary gear drives are known in the art and have been used in various ways including use for the purpose of driving a load at various speeds from a constant speed power source. However, such drives usually are relatively complicated, and usually, it is necessary to drive part of the gear train from a separate source such as through worm gearing. When worm gearing is used, override, or backdrive, makes it difficult to obtain the desired speed control, and when the pitch of the worm is such as to reduce the override, the efficiency of the worm gearing is relatively low. Accordingly, in order to provide the desired speed control, the horsepower of control motor must be a substantial percentage of the horsepower of the driving source. However, by using the right-angle drive of the invention with its much higher efficiency and freedom from backdrive, a substantially smaller control motor, or a substantially smaller amount of the source power, can be used to control the variable speed transmission of power from a source to a load. In addition, it is possible to construct a simple form of planetary gear, speed converter and to control it in a manner different from the manner in which such converters have been controlled in the prior art. FIGS. 9—13 illustrate the preferred form of the planetary gear, speed converter of the invention.

In FIGS. 9—12, the numeral 15 designates the power input shaft which may be the output shaft of the fixedly mounted electric motor 16. The numeral 17 designates the tubular output shaft rotatably mounted on the shaft 15 and carrying an internal ring gear 18 on a plate 14. Between the motor 16 and the output shaft 17, is a tubular auxiliary shaft 19, rotatably mounted on the input shaft 15 and carrying a ball-toothed gear denoted generally by the numeral 20, which is keyed thereto as at 21. The numerals 22,23 and 24 indicate spacer bushings, and 25,26 denote split spring rings in annular grooves in the main shaft 15, to maintain the assembly. The auxiliary shaft 19 carries an arm or plate 27. The input shaft 15 carries a gear 28 keyed to it, as at 29, which is usually called the central sun gear of the system. The arm 27, has rotatably mounted thereon a plurality of planetary gears 30, which are in meshed engagement with said sun gear 28 and the ring gear 18, the stud shafts 31 carrying said gears 30. It is evident that the shafts 15,17 and 19, rotate about a common axis. The ball gear 20 is in engagement with a spiral-grooved face gear 32, which is on the shaft 33 of a fixedly mounted, relatively small electric motor 34, whose speed is controllable by the rheostat 35. The ball-toothed gear 20 corresponds to the ball gear 65 in FIGS. 1—3, and the face gear 32 may be either the face gear 81 shown in FIGS. 1—4 or the face gear 85 shown in FIGS. 6—8, preferably the latter.

Each tooth of the ball gear 20, is a steel ball 36 held in a socket in the periphery of a wheel 37. Each such ball tooth is free to turn in all directions about its geometrical center like in a ball bearing. Each socket 36' is a spherical cavity segment whose altitude is no more than the sphere's radius and preferably a bit less. Notched ferrules 38,38' secured by screws 39,39' on the respective wheel faces, maintain the assembly, and mating notches, as at 40,40', form a hole in whose rim wall the associated ball is held captive, the diameter of such hole being less than the diameter of the ball. The ferrules preferably are made of thin, but strong, sheet metal. The ball 36 is exposed to the extent of a spherical segment nearly, but a bit smaller than a semisphere, such exposed part being the active part of the tooth which enters into the spiral channel or groove 41 of the face gear 32. On revolution of said face gear 32 advances the gear 20, one tooth. Of course, the centers of all the ball teeth are coplanar.

In operation, the input shaft 15, and hence the sun gear 28, turns counterclockwise as viewed from the left end in FIG. 9. The orbital gears 30 will therefore turn clockwise on their stud shafts 31. The ring gear 18, and hence the output shaft 17 will be turned clockwise. The direction of rotation of the auxiliary motor 34 is such that the arm 27, and hence the auxiliary shaft 19, will turn counterclockwise. The orbital gears 30, in revolving around the sun gear 28, in the same direction as the sun gear 28 revolves, will reduce the speed at which such orbital gears turn about their stud shafts. This causes the output shaft 17 to slow down. The higher the speed of motor 34, the slower will be the speed of the output shaft 17, until at some higher speed of said motor 34, the output shaft 17 will come to rest altogether. Upon a further increase in the speed of said motor 34, the output shaft 17 will rotate counterclockwise, which is in reverse of its former direction, and with continued increase in the speed of said motor 34, the speed of the output shaft 17 in the reverse direction will increase. The motor 34 is a comparatively small Universal series motor whose speed may be adjusted by manipulation of the rheostat 35.

In a working model built as shown in FIG. 9, which is drawn substantially to scale, the motor 16 was of one-twelfth horsepower, operated on 110 volts and its shaft speed was 1,728 r.p.m. The motor 34 was a series Universal motor, operated on 110 volts and was controlled by a rheostat 35 whose resistance was variable. The sun gear 28 had a pitch diameter of 0.75 inches and had 24 teeth. Each of the orbital gears 30 had a pitch diameter of 0.625 inches and had 20 teeth. The internal ring gear 18 had a pitch diameter of 2 inches and had 64 teeth. The ball-toothed gear 20 had a pitch diameter of 1.604 inches and had 20 teeth. The pitch of the convolutions of the spiral groove 41 of the face gear 32 was that of the teeth of said ball gear so such ball gear 20 moved one tooth for every revolution of said face cam. Of course, such dimensions are merely an example of one embodiment of the invention.

It will be noted that in the embodiment illustrated in FIGS. 9—12, the right-angle drive of the invention is used to control the movement of the planetary gears, as distinguished from the other gears in the train, and it has been found possible to control the speed of rotation of the output shaft 17 precisely and smoothly with a relatively small motor 34 even though the power rating of the motor 16 is many times that of the motor 34. This is attributable to the efficiency and freedom from backdrive of the right angle drive of the invention.

It will also be noted that the variable speed drive comprising the sun gear 28, the planetary gears 30 and the ring gear 18 is simple in construction and has all the shafts, the input shaft 15, the control shaft 19 and the output shaft 17, coaxial. No gears in addition to those in the planetary gear train are required to transfer the power from the motor 16 to the output or load shaft 17 thereby improving the efficiency as compared to other systems requiring such additional gears.

Instead of using an independent motor 34 to drive the auxiliary shaft 19, any suitable variable driving means powered by the input shaft may be provided therefor. One such means is shown in FIG. 13 and is indicated generally as 34'. In FIG. 13, all components corresponding to components in FIGS. 9—12 are marked with the same numerals respectively, but primed. Accordingly, the input shaft is designated by the numeral 15', the output shaft, by 17' and the auxiliary or speed-controlling shaft, by 19'. The arm 27' holds the planetary gears 30' which revolve on the stud shafts 31'. The sun gear is designated by the numeral 28', the ring gear, by 18' and the plate carrying the ring gear 18', by 14'.

The speed control drive 34' comprises a wheel 45 on a tubular shaft 56 which is keyed at 46 to the input shaft 15' but is slidable therealong. This wheel has a rubber tire 47 which is in frictional engagement with the surface of a plate 48 carried 76 a rotatable shaft 49 journaled on a stationary frame piece 50, which piece also carries the journaled shaft 51. The gears 52,53 on these shafts, mesh with an intermediate gear 54 which is rotatably carried on the stud 55. The shaft 51 carries the spiral grooved face gear 32' which cooperates with the ball-toothed gear 20' on the auxiliary shaft 19'. The ball gear 20' corresponds to the ball gear 75 illustrated in FIG. 5 and comprises two halves 42,43 held together by the screws 44 and carrying in the sockets thereof the balls 36'.

The numeral 62 designates a fixed bracket carrying a captive rotatable screw 53 operated by a turn knob 54. The screw 53 engages a threaded hole in an arm 55 in which the shaft 56 is journaled, so that upon turning said knob, the shaft 56 will slide along the input shaft 15', and hence, in changing the distance of the point of contact of the tire 47 from the center of the plate 48, the rotation speed of the shaft 44, the face gear 32' and the auxiliary shaft 19' will change. In this way, that is, by adjusting the knob 54, the speed of rotation of the output shaft 17' may be varied in the same manner that it is varied by controlling the speed of the motor 34.

Accordingly, by driving the control shaft 19' in the manner shown in FIG. 13, and described above, a separate control motor 34 is eliminated. However, because of the use of the right-angle drive of the invention and because of its characteristics, only a small amount of the driving force of the driving motor 16' is used for control purposes.

Although preferred embodiments of the invention have been illustrated and described, it will be apparent to those skilled in the art that such embodiments are illustrative only and that various modifications may be made therein without departing from the principles of the invention. For example, instead of a single spiral groove, the face gear may have a plurality of, or multilead, spiral grooves so as to reduce the ratio of output to input speeds.

I claim:

1. A right-angle drive comprising a rotatable ball-toothed gear, said gear having a rotatable body and a plurality of spaced balls mounted for universal rotation at the periphery thereof at equal distances from the axis of rotation of said body, each of said balls having an exposed surface facing radially outwardly of said axis, and a rotatable face gear having a spiral groove in the face thereof which spirals outwardly from the axis of rotation of said face gear and which faces outwardly from said face in the direction of the axis of said face gear, said groove having an arcuate cross section with a radius slightly greater than the radius of said balls, said ball-toothed gear being mounted with its axis of rotation extending substantially at right angles to the axis of rotation of said face gear and with at least one of said balls in said groove with the exposed surface of the ball in engagement with the bottom of said groove.

2. A right-angle drive as set forth in claim 1 wherein said axes are nonintersecting. a, 3. A right-angle drive as set forth in claim 1 wherein the bottom of said groove lies, in cross section, along an arc having a radius substantially equal to the radius of the outermost surfaces of said balls from the axis of rotation of said ball-toothed gear, whereby a plurality of said balls are simultaneously in said groove.

4. A right-angle drive as set forth in claim 1 wherein said face gear is mounted on a shaft and further comprising means for rotation said shaft.

5. A right-angle drive as set forth in claim 4 wherein said means comprises means for adjusting the speed of rotation of said shaft.